UNITED STATES PATENT OFFICE 1,989,380

PREVENTION AND REMOVAL OF SLIME FORMATIONS

Isabella B. Romans, Tuckahoe, N. Y.

No Drawing. Application June 15, 1934, Serial No. 730,756

3 Claims. (Cl. 210—28)

This invention provides a new and improved method for the prevention and removal of slime formations on the cooling surfaces of condensers such as are used commonly in public utility generating stations. This slime or scum forms on the inner surface of the condenser tubes and acts as an insulator, thus reducing the heat transfer and seriously affecting the vacua obtainable in the condenser.

The methods in use at the present time are: (1) To shut down the entire unit and remove the slime mechanically by pushing rubber plugs through the tubes or by various methods of brushing and boiling the tubes. This necessitates taking the condenser out of service periodically and increases the cost of labor materially. (2) To treat the water with chlorine intermittently, under mechanical control. This latter method will be discussed below in greater detail.

Although this invention is described for use in condensers, it is obvious that the principles may be employed whenever the prevention and removal of slime formations on surfaces in contact with water are indicated.

It is generally accepted that the causes for these slime formations originate in the water which is circulated through the condenser. These formations are composed usually of encapsulated bacteria, iron bacteria, algae and much mineral matter which has become entangled in the filaments of the iron bacteria and the zooglea formed by the encapsulated bacteria. I discovered that there exists a sequential symbiosis of the encapsulated bacteria and the iron bacteria. I also discovered that the acid production of the former made possible the growth of the latter, and that the final conditions in the film and slime were acidic although the water was usually neutral or slightly alkaline.

It has been proposed by others (U. S. Patent No. 1,745,141) that this slime formation may be prevented by the mechanically controlled intermittent treatment of the water with chlorine which is introduced just before the water enters the tubes. I have found this treatment inadequate in waters which have a high organic content and therefore exhibit a high chlorine demand, meaning the amount necessary to satisfy the capacity of the water to neutralize the chlorine. The amount to do this and leave a slight excess or residual is so great that it makes the cost of operation prohibitive. Unless large quantities of chlorine are used there is the danger that if the bacteria are not completely killed the stronger ones will be revived when the raw water is circulated again and the residual chlorine is washed away. Each time this is done the bacteria develop an increased tolerance for chlorine and soon are not affected by even higher concentrations.

I propose the use of chloramines instead of chlorine for the treatment of the circulating water. Chloramines act germicidally more slowly than chlorine and are, therefore, less rapid in early effects, when used in equal concentration to chlorine. I have discovered, however, that even with a slight lag in the rate of onset of the destructive effect of the chloramines on the film of bacteria their destructive effects once initiated are more vigorous and the final effects more nearly a totality of destruction than has been obtained with the use of chlorine.

Waters of high organic content do not exhibit as high a demand for chloramine as they do for chlorine, thus leaving the chloramine freer to act as a sterilizing agent and permitting lower doses to maintain residuals longer. This increases the effectiveness of the disinfectant and reduces the amount necessary for sterilization.

After a film of slime has been removed by my treatment, it is desirable to subject the water to the treatment periodically, so that the formation of new film is effectively prevented.

The treatment comprises the periodic introduction of chloramines (monochloramine $NH_2Cl$, dichloramine $NHCl_2$, and/or trichloramine $NCl_3$) to the water at a point before it enters the condenser tubes. The amount of chloramines and frequency of treatment are determined by the quality of the water, length of treatment, temperature, velocity and other variable factors. As a rule it is sufficient to maintain a residual chloramine of from 0.1 to 1.0 parts per million in the effluent. The concentration of chloramine and the length and frequency of the treatment are also determined by the extent of contamination in the condenser and the resistance of the slime forming organisms in the water.

In carrying out this process the chloramines may be formed of the constituent gases in an aqueous medium and then introduced to the water, or they may be formed by injecting ammonia gas or aqua ammonia into the flowing water followed by chlorine or vice versa. The chloramines may also be pre-formed and added to the water, separately or together, or by any other method which would result in the addition of any or all of the chloramines to the water. The ratio of ammonia to chlorine is dependent on the quality of the water, temperature, velocity and other variable factors but chloramines are usually formed when the ratio is 1:2 to 1:4 respectively. Chloramines are most efficient in water where the hydrogen ion concentration is between pH 6.0 and pH 8.0 but show some activity on both the acid and alkaline sides of this range.

I claim:

1. The method of preventing the deposit and growth of slime-forming organisms on the surfaces of condensers and heat exchange apparatus, in contact with flowing water or removing deposits already formed on such surfaces, which consists in adding chloramines to such flowing water before it reaches such surfaces, the quantity of chloramines per unit of water immediately prior to contact thereof with such surfaces being such that the water after leaving such surfaces contains at least a small quantity of residual chloramines, whereby said water is employed as a diluent for the chloramines and as a carrier for bringing said chloramines into contact with said organisms.

2. The method of preventing the deposit and growth of slime-forming organisms on the surfaces of condensers and heat exchange apparatus, in contact with flowing water or removing deposits already formed on such surfaces, which consists in adding chloramines to such flowing water before it reaches such surfaces, the quantity of chloramines per unit of water immediately prior to contact thereof with such surfaces being such that the water after leaving such surfaces contains at least a small quantity of residual chloramines, whereby said water is employed as a diluent for the chloramines and as a carrier for bringing said chloramines into contact with said organisms, continuing this treatment for a period of time depending upon the resistance of the organisms to be destroyed and then interrupting the treatment until a new deposit of organisms in deleterious quantity has been formed.

3. The method of preventing the deposit and growth of slime forming organisms on surfaces in contact with flowing water or removing deposits already formed on such surfaces, which consists in providing chloramines in such water, the quantity of chloramines per unit of water immediately prior to its contact with such surfaces being such that the water after leaving such surfaces contains residual chloramines, the quantity of such residual chloramines being from approximately one-tenth part to approximately ten parts of chloramines per million of water.

ISABELLA B. ROMANS.